United States Patent Office 3,254,485
Patented June 7, 1966

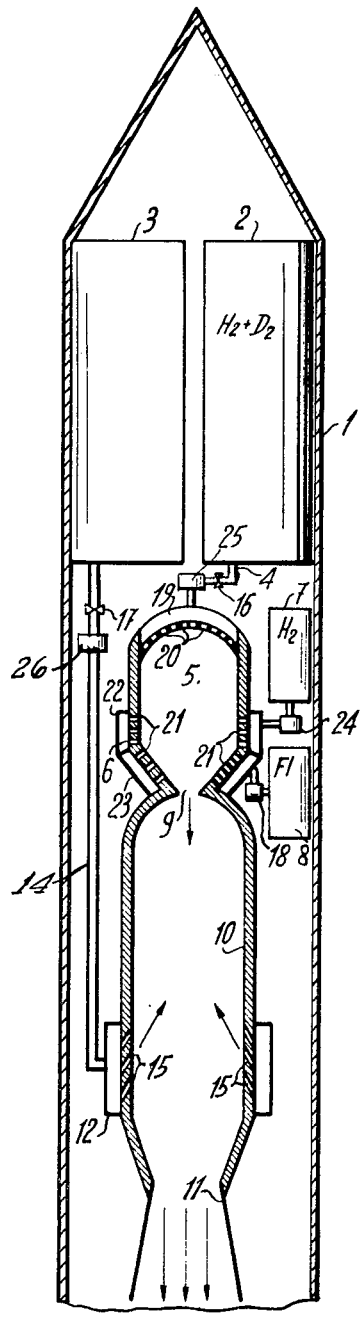

3,254,485
METHOD AND ARRANGEMENT FOR BURNING A FUEL CONTAINING HYDROGEN AT A VERY HIGH TEMPERATURE
Gustave Bernstein, Barcelona, Spain, assignor to Activatom S.A., Geneva, Switzerland, a corporation of Switzerland
Filed June 21, 1963, Ser. No. 289,542
Claims priority, application Switzerland, Nov. 6, 1962, 12,931/62
6 Claims. (Cl. 60—35.4)

The present invention has for its object a method for raising the combustion temperature of a fuel containing hydrogen $H_2$, said method consisting in mixing the combustive hydrogen with at least one of its isotopes such as deuterium $D_2$ and deuterium hydride HD, after which said combustive mixture is subjected to a thermal activation before it is set in contact with the material which is to burn it.

The invention has also for its object an arrangement for executing said method and releasing energy of the type including a fuel container, a container for the agent which is to burn the fuel and a combustion chamber, the invention consisting in that said arrangement includes a preliminary combustion chamber inserted in the path of the fuel between its container and the combustion chamber, said preliminary chamber being provided with means for the thermal activation of the fuel.

The invention has also for its object the application of the above-defined method and chiefly a jet engine for rockets incorporating the arrangement referred to hereinabove.

The accompanying drawings illustrate diagrammatically and by way of example a preferred embodiment of the invention, as incorporated with a jet engine intended for use for instance on a rocket.

The single figure of said drawing is an axial diagrammatic cross-section of said arrangement carried inside the body of a rocket.

The usual temperature of combustion of hydrogen is of a magnitude of 3,000° K. Said temperature is limited, on the one hand, by the cooling of the walls of the chamber inside which the combustion reaction is performed and, on the other hand, by a considerable absorption of heat ascribable to the phenomenon of molecular dissociation of the fuel when reacting with the agent adapted to burn it.

It is possible to remedy to the cooling of the walls by insulating them, but it has not been possible hitherto to cut out the lowering of the combustion temperature produced by the endothermic molecular dissociation and this problem has formed the object of the present invention. Before disclosing the results obtained, it should be mentioned that the transient apparition of free atoms of hydrogen which recombine at a very high rate through treble shocks so as to form molecular hydrogen, prevents resorting to molecular hydrogen as a fuel instead of previously prepared and available molecular hydrogen.

Said lack of positive results has led to searching means for atomizing, before its actual combustion, molecular hydrogen to which are added its heavy isotopes: deuterium $D_2$ and deuterium hydride HD and also for dissociating into atoms these isotopes alone before their combustion.

For such searches, it has been assumed that the insufficiently long life of the atoms released out of hydrogen alone is compensated, during the preliminary activation of the fuel mixture through atomic dissociation in the absence of any oxygen, by the presence of the heavier released atoms of deuterium the life of which is longer.

Since the very beginning of applicant's experiments, it has been found that even with low contents of say 10% of deuterium in the hydrogen mixture, there may be obtained an activation of the fuel mixture, as a consequence of a preliminary heating leading to a dissociation and thereby to an increased exothermic character of the subsequent combustion.

The continuation of the experiments has shown that mixtures of hydrogen with its isotopes, containing 30 to 70% of deuterium, which mixtures are subjected to a preliminary heating to a temperature of about 3,000 to 4,000° C. in the absence of any oxygen, can be activated to a substantial extent. The contacting of said mixture with the medium burning it in a subsequent stage of a chain reaction, allows rising considerably beyond the usual limit temperature of combustion, which is of about 3,000° K. up to a value above 4,500° K.

Of course, the proportion between hydrogen and its isotopes has been given hereinabove only by way of example and in a non-limiting sense. They vary according to the grade of activation and to the increase in the temperature of combustion required, taking also into account the cost price of the products involved. Under such conditions, it is possible to use the isotopes alone or in admixture, even in the absence of any molecular hydrogen.

The practical execution of the method defined hereinabove is obtained by preparing a fuel mixture of hydrogen and at least one of its heavy isotopes. The methods producing the isotopes of hydrogen are well-known.

A mixture $H_2$, $D_2$, HD may be obtained, inter alia, by decomposing heavy water $D_2O$ by a metal. At a raised temperature, $D_2O$ produces through decomposition $D_2$ and furthermore:

$$D_2 + H_2 \rightleftharpoons 2HD$$

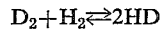

Said equilibrium has formed the object of various investigations and publications: H. C. Urey and his assistants, in Journal de Chimie et de Physique, 1933, 1, page 137, and 1934, 2, page 48.

The fuel mixture containing the variable proportions, referred to hereinabove, of its components is liquefied with a view to loading it for use, for instance, in a rocket.

The preliminary heating operation is performed by activating the fuel through a partial atomization of deuterium at about 3,000° C., said deuterium being injected into a preliminary combustion chamber, protected against the action of oxygen. The actual activation may be obtained by causing the jet of gasiform fluid to pass between two cooled tungsten electrodes adapted to form an electric arc with a current of an intensity of say 50 amperes under 800 volts, which method has already been used for hydrogen alone by Langmuir.

A still more complete activation may be obtained by treating the fuel at about 4,000° C., said temperature being obtained, for instance, by the fluorine/hydrogen or fluorine and fuel blowpipes serving for the ignition of the main combustion.

Such an arrangement has been illustrated in the drawing showing a rocket of which the body 1 encloses a container 2 carrying a mixture of liquid fuel constituted by hydrogen and deuterium for instance, a container 3 containing the agent which is to burn said fuel, such as oxygen. A pipe 4 provides a passageway for the fuel out of the container 2 into a header 19 feeding a set of jets 20 opening into the upper section of a preliminary combustion chamber 5. Into the lower section of said preliminary chamber 5, there open also the nozzles 21 forming part of burner blowpipes 6 fed through outer headers 22 and 23 feeding the nozzles respectively, say, with hydrogen and with fluorine, the hydrogen and fluorine being fed to said outer headers by the corresponding auxiliary containers 7 and 8.

Of course, as a modification, the container 7 may be cut out and replaced by a pipe fed directly with a fraction of the fuel diverted out of the container 2 into the burner blowpipe system 6. The preliminary combustion chamber 5 communicates directly through a funnel shaped throttled section 9 or any other suitable connecting means with the actual combustion chamber 10 terminating with a nozzle 11 through which the combustion gases are exhausted. A header 12 surrounds the lower section of the combustion chamber 10 and is adapted to carry the fluid which is to burn the fuel, which is constituted in the present case by oxygen fed by the container 3 through a pipe 14. The entrance of said oxygen or the like fuel-burning fluid into the combustion chamber 10 is performed through the nozzles 15 fed by the header 12 and adapted to direct said fuel-burning fluid in counter-current relationship with reference to the input of the activated fuel entering the chamber 10 through the throttling section 9.

A valve 16 allows adjusting the feed of fuel through the pipe 4 towards the header 19 feeding the nozzles 20. A similar valve 17 allows also adjusting the feed of the fluel-burning fluid through the pipe 14 leading to the nozzles 15.

Since the fluorine gas F and the liquid, hydrogen liquid $H_2$, contained in the corresponding auxiliary containers 7 and 8 are subjected to a presure of say 25 kg./sq.cm. for the fluorine, a pressure reducing device 18 is inserted between the auxiliary container 8 and the group of burner blowpipes 6 while a sluice 24 controls the passage of the hydrogen towards said burner blowpipes 6 through independent channels.

The operation of the compound arrangement described hereinabove with reference to the drawing, is as follows: after it has passed out of the header 19, the combustive mixture is injected through the nozzles 20 into the preliminary combustion chamber 5, and reaches the area carrying the flames of the burner blowpipes 6, which flames are spontaneously ignited by the mingling in the nozzles 21 of the burner blowpipes 6, of the hydrogen fed by the container 7 with the fluorine fed by the container 8. Said flames reach a temperature above 4,000° C., which leads consequently to an energetic activation of the combustive mixture which flows through the advantageously funnel-shaped throttled section, or the like communication port 9 into the actual combustion chamber 10 in an activated condition. Said activation is ascribable to the release of the atoms of deuterium. The activated combustive mixture enters the combustion chamber 10 where it is set in the presence of the combustion producing agent constituted by oxygen in the case considered.

Inside the combustion chamber, the activated combustive mixture is in contact during a chain reaction with the desired combustion supporting agent, constituted in the case considered, by the oxygen introduced in situ, so as to form the seat of the combustion. The temperature of the latter rises then above 4500° K. and this leads to an ejection of the combustion gases through the nozzle 11 at a high speed, by reason of the increase obtained for the combustion temperature.

Such an arrangement is of particular interest when incorporated with the jet engines intended for use on rockets, which allows obtaining an increase in power and speed for the latter. The rocket engines operating hitherto with liquid hydrogen and a suitable combustion supporting agent such as liquid oxygen, provide combustion temperatures of about 3000° K. The application of the above described method to such types of know rockets allows increasing their power through an increase in the temperature of combustion, which latter may rise above 4500° K. and this results in an important acceleration of the ejected combustion gases.

The modification of the extant arrangements serving as rocket engines may be obtained simply by incorporating with such known arrangements a preliminary combustion chamber which allows a preliminary heating prior to the combustion of the fuel of the combustive mixture containing, for instance, hydrogen and deuterium.

Of course, it is necessary to provide further insulating coatings for the walls and for the engine parts subjected to the action of a very high temperature and to corrosion. It is advantageous for instance, to resort to Monel alloys and the refractory derivatives thereof.

It should be remarked that no firing is required inside the combustion chamber 10, the firing being transmitted automatically by the preliminary combustion chamber 5 as a consequence of the activation of the combustive mixture by the burner blowpipes 6 or else by an electric arc having a high current density, either of said thermal activating means being used indifferently.

Since the application of the arrangement described with reference to the accompanying drawing relates to the operation of rockets, it is obvious that well-known auxiliary apparatus should be used for ancillary operations. In particular, turbo-pumps 25 and 26 should be inserted in the pipes 4 and 14 and possibly even in the pipe connecting the auxiliary container 7 with the header 22, so as to ensure the feed of fuel, of combustion-supporting fluid, and also of hydrogen.

In the preceding description, the method and the arrangement described have been referred to as applied to the field of rocket engines. However, it should be understood that the advantages of the rise in the temperature of combustion of a fuel containing hydrogen, are applicable to any other apparatus resorting to such fuels.

I claim:

1. A method for burning a fuel containing hydrogen at a very high temperature, consisting in mixing hydrogen ($H_2$) with at least one deuterium liberating substance selected from the group consisting of deuterium ($D_2$) and deuterium hydride (HD), subjecting the combustive mixture obtained to a thermal activation at a temperature ranging between about 3000° C. and above about 4000° C. and subjecting the activated mixture to the combustive action of a combustion-supporting agent.

2. A method for burning a fuel containing hydrogen at a very high temperature, consisting in mixing hydrogen with at least one deuterium liberating substance selected from the group consisting of deuterium and deuterium hydride, subjecting the combustive mixture obtained to a thermal activation at the temperature of molecular dissociation of the isotopes of hydrogen into atoms of deuterium, said temperature ranging between about 3000° C. and above about 4000° C. and subjecting the activated mixture to the combustive action of a combustion-supporting agent.

3. A method for burning a fuel containing hydrogen at a very high temperature consisting in mixing hydrogen with at least one deuterium liberating substance selected from the group consisting of deuterium and deuterium hydride, subjecting the combustive mixture obtained to a thermal activation at a temperature ranging between about 3000° C. and above about 4000° C. by means of heat produced by the combustion of fluorine burning with hydrogen and subjecting the activated mixture to the combustive action of a combustion-supporting agent.

4. A method for burning a fuel containing hydrogen at a very high temperature, consisting in mixing hydrogen with at least one deuterium liberating substance selected from the group consisting of deuterium and deuterium hydride, subjecting the combustive mixture obtained to a thermal activation at a temperature ranging between about 3000° C. and above about 4000° C. by means of heat produced by the combustion of fluorine burning with the combustive mixture and subjecting the activated mixture to the combustive action of a combustion-supporting agent.

5. A method for burning a fuel containing hydrogen at a very high temperature, consisting in mixing hydrogen with at least one deuterium liberating substance selected from the group consisting of deuterium and deuterium hydride, subjecting the combustive mixture obtained to a thermal activation at a temperature ranging between about 3000° C. and above about 4000° C. produced by an arc carrying a high density current and subjecting the activated mixture to the combustive action of a combustion-supporting agent.

6. A method for burning a fuel containig hydrogen at a very high temperature, consisting in mixing hydrogen with at least one deuterium liberating substance selected from the group consisting of deuterium and deuterium hydride, subjecting the combustive mixture obtained to a thermal activation at a temperature ranging between about 3000° C. and above about 4000° C. and subjecting the activated mixture to the combustive action of a combustion-supporting agent fed in countercurrent relationship with the activated mixture.

References Cited by the Examiner

UNITED STATES PATENTS

| 2,988,879 | 6/1961 | Wise | 60—35.6 |
| 3,000,174 | 9/1961 | Vose | 149—87 |
| 3,023,573 | 3/1962 | Friedman | 60—35.6 |
| 3,066,478 | 12/1962 | Carmody et al. | 60—35.4 |
| 3,092,959 | 6/1963 | Scurlock et al. | 60—35.4 |

LEON D. ROSDOL, *Primary Examiner.*

CARL D. QUARFORTH, REUBEN EPSTEIN,
*Examiners.*
B. R. PADGETT, *Assistant Examiner.*